United States Patent [19]

Duff

[11] Patent Number: 5,103,681

[45] Date of Patent: Apr. 14, 1992

[54] DIAMETRAL CLAMP ELEMENT FOR CYLINDRICAL MEMBERS

[75] Inventor: Winslow K. Duff, Export, Pa.

[73] Assignee: Westinghouse Electric Corp., Pittsburgh, Pa.

[21] Appl. No.: 556,786

[22] Filed: Jul. 9, 1990

[51] Int. Cl.⁵ .............................. G01L 1/26; G01B 7/12
[52] U.S. Cl. ........................ 73/862.54; 33/555.1; 33/783; 73/781; 73/862.65; 269/257
[58] Field of Search ............... 73/862.54, 730, 774, 73/782, 781, 862.65, 862.62; 33/783, 555.1; 81/418, 424.5, 421, 426.5; 269/257, 265, 270, 268, 275, 258; 279/123

[56] References Cited

U.S. PATENT DOCUMENTS

| | | |
|---|---|---|
| 2,416,664 | 2/1947 | Ruge . |
| 3,535,937 | 10/1970 | Wiggins et al. ............. 73/862.65 X |
| 3,866,473 | 2/1975 | Teitelbaum et al. ............ 73/730 X |
| 4,290,311 | 9/1981 | Brewer .................... 73/730 |
| 4,542,649 | 9/1985 | Charbonneau et al. . |
| 4,543,725 | 10/1985 | Gounelli et al. .................... 33/555.1 |
| 4,587,739 | 5/1986 | Holcomb et al. . |
| 4,805,451 | 2/1989 | Leon . |
| 4,856,327 | 8/1989 | Branam et al. . |
| 4,911,004 | 3/1990 | Leon . |
| 4,930,228 | 6/1990 | Anderson et al. ..................... 33/788 |
| 4,936,150 | 6/1990 | Burke et al. ...................... 33/788 |

Primary Examiner—Charles A. Ruehl

[57] ABSTRACT

A diametral clamp element includes a body having one end connectable to a clamping device, a contact point located on an opposite end of the body in line with a clamping force vector of the clamping device, and a centering device disposed symmetrically about the contact point for aligning the center of the substantially cylindrical member with the contact point and thus the clamping force vector and holding the alignment thereof during application of the clamping force. In one embodiment, the centering device is a pair of flexures formed symmetrically about the contact point, whereas in an alternative embodiment, the spring centering device includes a pair of spring-loaded pins, each having a rounded head for providing centering contact points.

9 Claims, 4 Drawing Sheets

DIAMETRAL CLAMP ELEMENT FOR CYLINDRICAL MEMBERS

BACKGROUND OF THE INVENTION

1. Field of the Invention

The present invention relates generally to the field of measuring and testing and, more specifically, to a diametral clamp element used in devices for determining axial loads on a generally cylindrical member.

2. Description of the Related Art

In many areas it is necessary to measure diametral changes in generally cylindrical members to determine axial load.

One known device for determining axial loads is described in U.S. Pat. No. 4,911,004, issued to Leon. As shown in FIG. 2 herein, the Leon device is a clamping mechanism in which a pair of clamp elements A and B are positioned in contact with a cylindrical member (shown in phantom lines) by an adjustment screw which carries clamp element A. The clamp body, which is in the form of a C-clamp, is coupled to a strain gauge which is further coupled through an A/D converter to a computer. The device thus enables a determination of axial loading on the cylindrical member from signals generated by the strain gauge.

Each of the clamping members A and B is described as a V-block with a constant included V-angle of about 150°. The angle is designed to permit the transmission of a percentage of the diametral change to the measuring device through the clamp body. The V-shaped elements provide torsional stability for the clamp assembly as well as transmitting a portion of the diametral change to the clamp assembly.

Clamp element A is illustrated in greater detail in FIG. 3, wherein it can be seen that, while the V-shaped surface of the clamp element is useful in centering the clamp element A relative to the cylindrical member, the cylindrical member is actually contacted at two different contact points, C and D, located on opposite sides of the line of symmetry of the cylindrical member. By having the point (or points) of contact away from the centers of both the clamping element and the cylindrical member, deformation or elasticity in the V-clamp surface can significantly contribute to measurement error.

Thus, a need exists for an improved clamping element which is capable of transmitting 100% of the diametral change to a measuring device while at the same time providing torsional stability.

SUMMARY OF THE INVENTION

An object of the present invention is to provide a diametral clamp element for use in a clamping device which measures axial load in a substantially cylindrical member, capable of transmitting 100% of diametral changes to the clamping device so that a more accurate measurement can be obtained Another object of the present invention is to provide a diametral clamp element which provides torsional stability while at the same time permitting transmission of 100% of the diametral changes in a substantially cylindrical member.

These and other objects of the invention are met by providing a diametral clamp element for use in a clamping device which measures axial load in a substantially cylindrical member having a center, including a body having one end connectable to the clamping device, a contact point located on an opposite end of the body in line with a clamping force vector of the clamping device, and centering means, disposed to exert symmetric forces about the contact point, for aligning the center of the substantially cylindrical member with the contact point and thus the clamping force vector and holding the alignment thereof during application of the clamping force. Preferably, the clamping force deflects the spring centering means until the contact point meets the cylindrical body.

These and other features and advantages of the diametral clamp element for cylindrical members of the present invention will become more apparent with reference to the following detailed description and drawings.

DETAILED DESCRIPTION OF THE PREFERRED EMBODIMENTS

Figure 1:
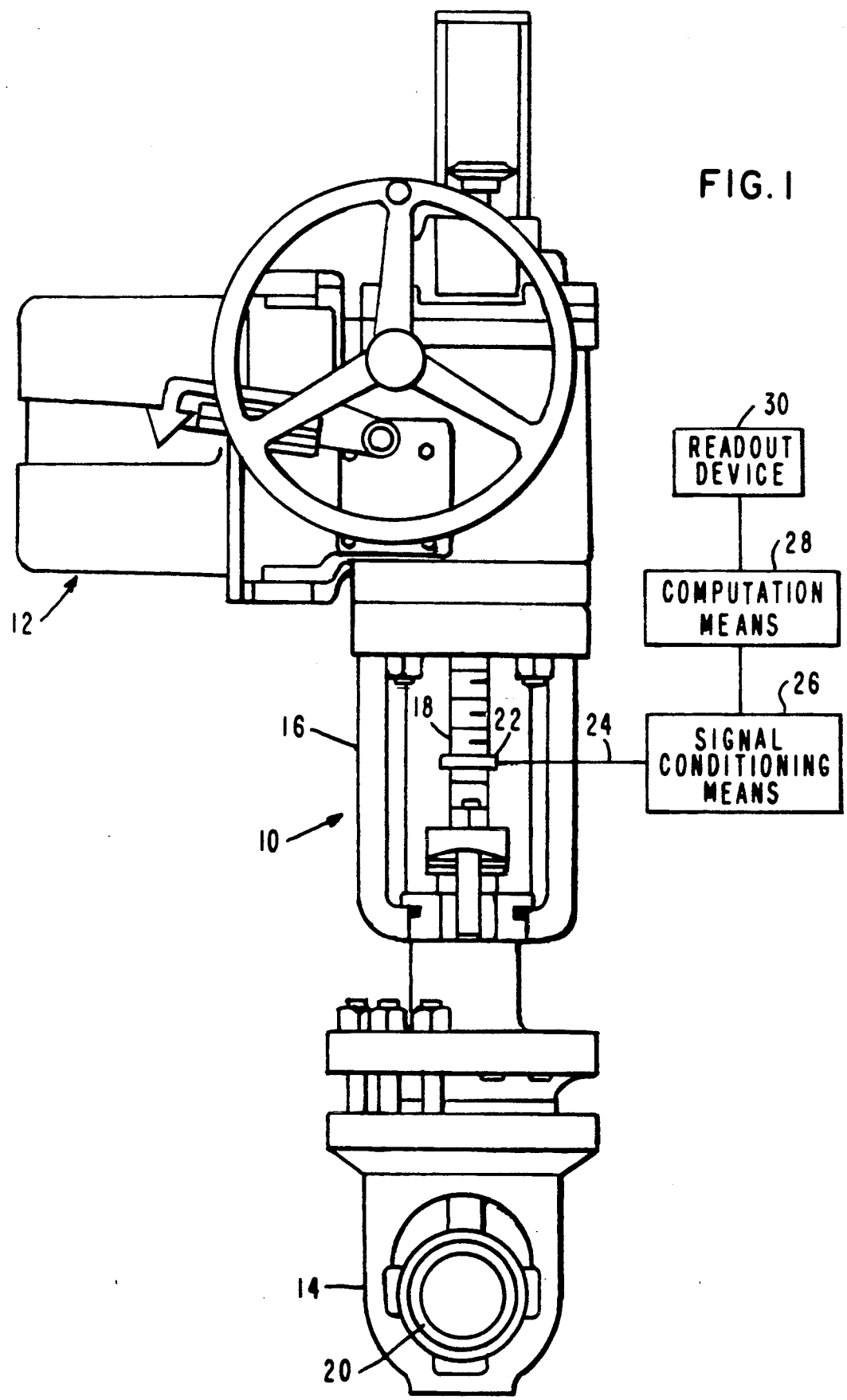
FIG. 1 is a side elevational view, partly schematic, showing a motor operated valve employing a device for determining an axial load which incorporates the diametral clamp elements according to the present invention.
Figure 2:
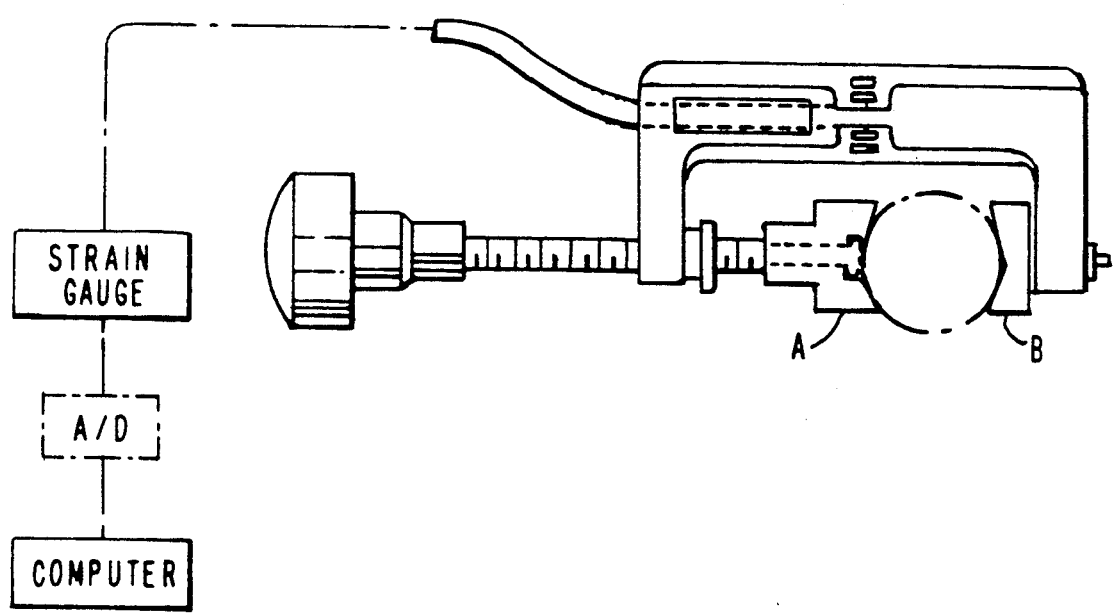
FIG. 2 is a diagrammatic view of a known C-clamp-type clamping device capable of using the diametral clamp elements according to the present invention.

Referring to the drawings, shown in FIG. 1 is a motor operated valve assembly generally comprised of a motor operator 12 and a valve 18 connected by a yoke 16. The yoke extends partially around a valve stem 18 which connects the valve to the motor operator. The valve has a valve gate 20 which is connected to the valve stem so as to be movable between a closed or seated position in which it is engaged with the valve seat and an open or back seated position in which it engages a valve back seat. The valve gate is shown in a closed or seated position in FIG. 1. The motor operated valve 10 is of a type which is generally well known and is readily commercially available.

A sensing device 22 is mounted on the valve stem 18 as shown in FIG. 1 for measuring diametral changes in the valve stem under various load conditions. The sensing device 22 may be mounted either on the threaded portion or the smooth portion of the stem. The sensing device generates signals responsive to the sensed diametral changes and the signals are transmitted via suitable means such as cable 24 to a signal conditioning means 26 from where they are sent to computational means 28. The computation means 28 may be programmed to determine axial load from the diametral changes in the stem. A read out device 30 is connected to the computation means to provide an indication of the axial load on the stem as it is moving. The indication can be a simple numeral read out or a plot of axial load verses time or axial load verses valve position.

The sensing device 22 may be a clamping device employing a pair of diametrically opposed clamps holding a substantially cylindrical member therebetween. In the case of the motor operated valve assembly, the substantially cylindrical member is the valve stem 18. Thus, the sensing device 22 may have a C-clamp-type clamp body or other similar supporting structure for carrying a pair of diametral clamp elements.

Figures 4, 4A:
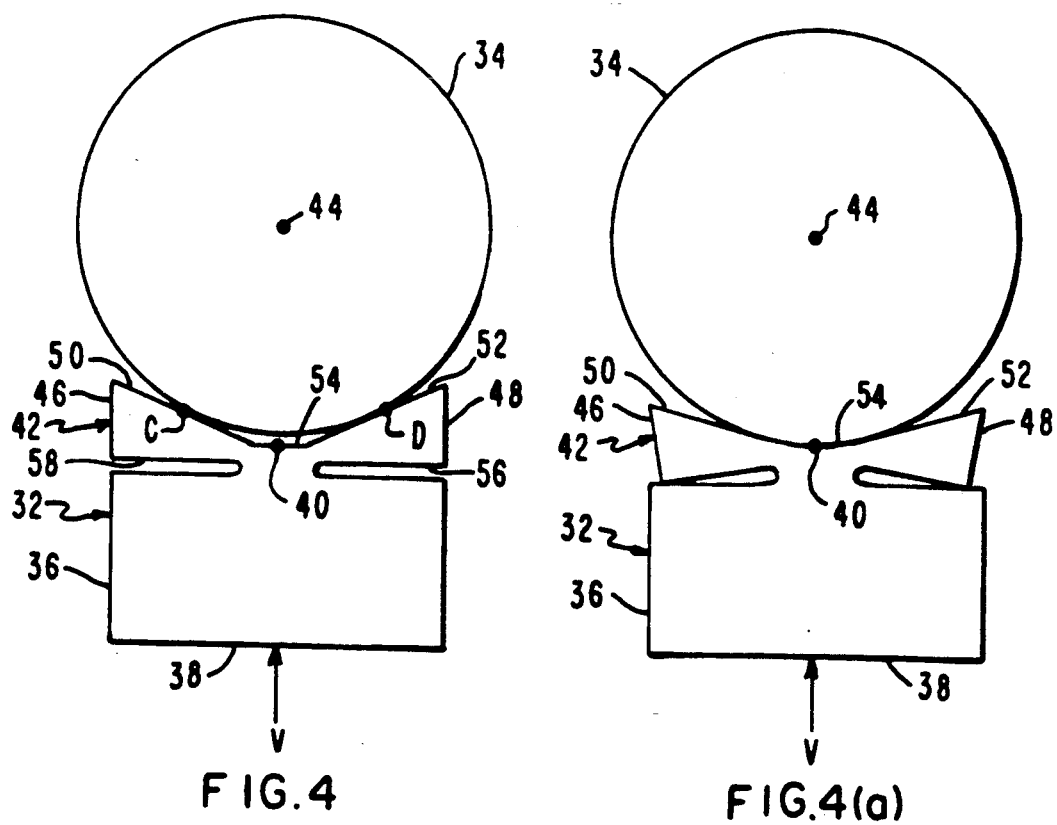
FIG. 4 is a top view of a first, preferred embodiment of the present invention showing a diametral clamp element in juxtaposition to a cylindrical member prior to application of a clamping force.
FIG. 4(a) is a view similar to FIG. 4, after application of a clamping force.

In a preferred embodiment, and referring now to FIGS. 4 and 4(a), a clamp element 32 is used in a clamping device which measures axial load in a substantially cylindrical member 34, and includes a body 36 having one end 38 connectable to the clamping device by any suitable means, such as threaded fasteners, couplings, etc. A contact point 40 is located on an opposite end of the body 36 in line with a clamping force vector V of the clamping device.

Figure 3:
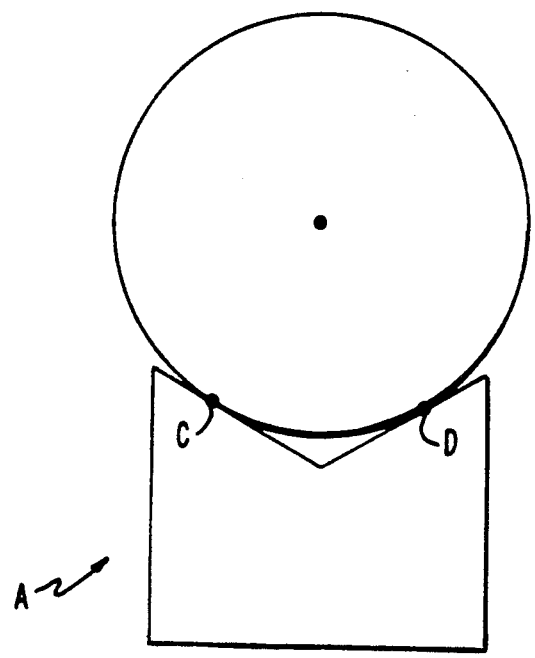
FIG. 3 is a detailed view of a clamp element according to the known clamping device of FIG. 2.

Spring centering means 42 are disposed symmetrically about the contact point 40, for aligning the center 44 of the substantially cylindrical member 4 with the contact point 40 and thus the clamping force vector V. The spring centering means 42 includes a pair of flexures 46 and 48, each having a flat surface 50 and 52, respectively, intended to help center the cylindrical member 34 by making initial contact at points C and D. These contact points, C and D, are analogous to the contact points of the prior art illustrated in FIG. 3. However, in the present invention, the pair of flat surfaces 50 and 52 are spaced apart by an intervening, horizontal surface 54, the center of which provides the contact point 40. Each of the flexures 46 and 48 are capable of deforming through flexing away from the cylindrical member 34 upon application of a clamping force in the direction of vector V. Thus, as shown in FIG. 4(a), the contact point 40 becomes the point at which deformations of the cylindrical member are transmitted directly to the diametral clamp element 32 so as to achieve a 100% transmission.

Thus, according to the present invention, the points C and D are provided as centering contacts, whereas the point 40 is a single point, change in diameter transmission contact point, whereby changes in diameter of the cylindrical member 34 can be accurately sensed Even if, after application of the clamping force, the points C and D are still in contact, they are not direct force transmission contact points because they are yieldable. The point 40 is non-yieldable and, once this point is common to both the cylindrical member 34 and the diametral clamp element 2, and direct transmission of changes and diameter of the cylindrical member can be made.

The flexures 46 and 48 can be made in one piece with the body 36 by forming radially inward cuts 56 and 8 by any suitable process steps, such as machining. The flexures have a flexible or deformable quality by virtue of the ability of metal to band. The preferred metal from which the clamp element is formed is stainless steel. The cuts 56 and 58 may be formed of length and width which provide a desired amount of flexibility. Thus, the size and location of the cuts may be selected depending on the diameter of the cylindrical member to be tested. Variations of the FIG. 4 embodiment can be envisioned, in which the cuts 56 and 58 are expanded in vertical direction so as to provide spaces for springs which would bias the flexures upwardly and permit deformation upon application of a clamping force.

The body may typically be about 0.5 to 0.75 inches (12.7 to 19.05 mm) square, with a thickness selected to provide three-dimensional stability. For example, in the range mentioned above, the thickness may be about 0.5 inches.

Figure 5:
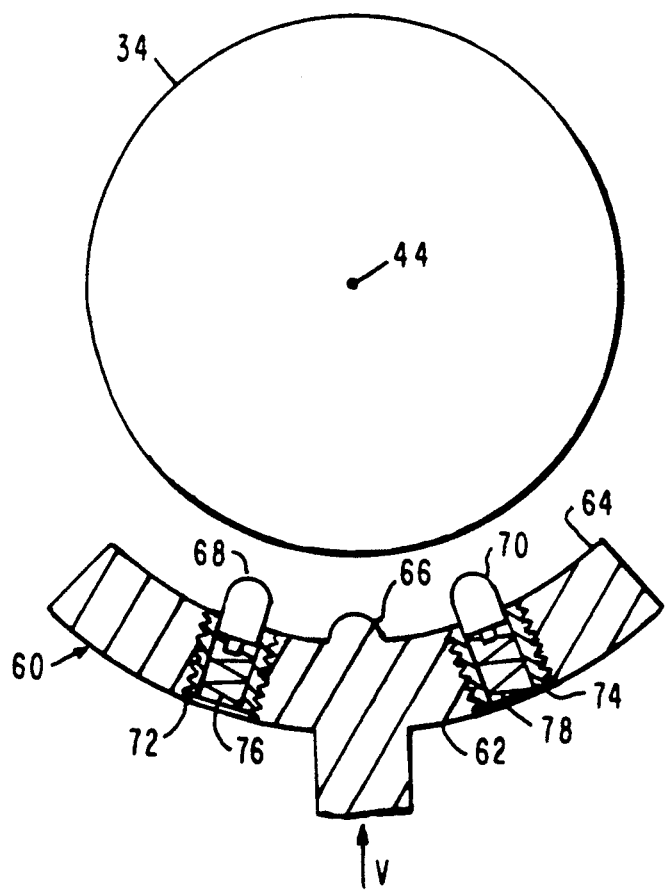
FIG. 5 is a top view of a second, preferred embodiment of a diametral clamp element according to the present invention, prior to application of a clamp force.
Figure 5A:
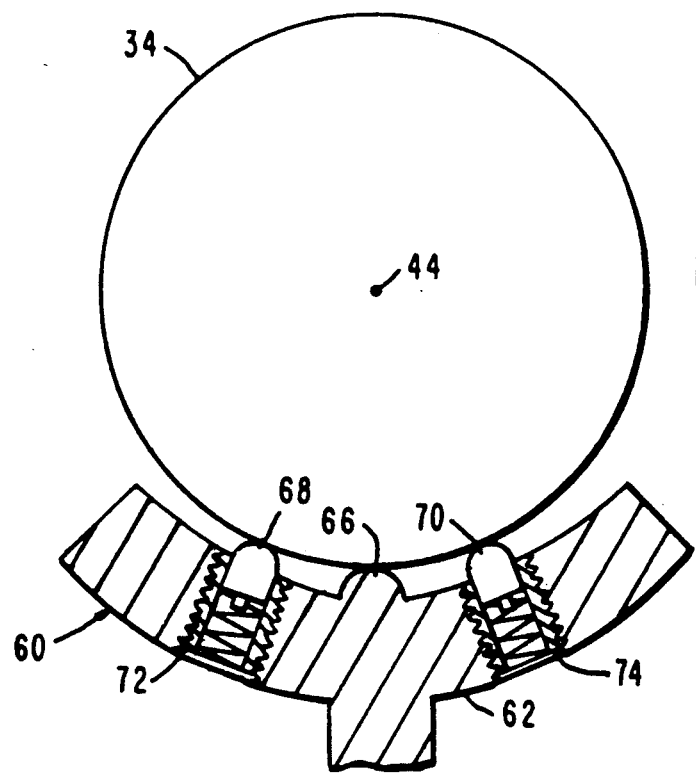
FIG. 5(a) is a view similar to FIG. 5, after application of a clamping force.

An alternative embodiment is illustrated in FIGS. 5 and 5(a), in which the clamp element 60 is formed as an arcuate body 62 having a concave surface 64, at the center of which a rounded contact protrusion 66 is integrally formed or otherwise attached thereto. The protrusion 66 provides a contact point, similar to the contact point 40 of the FIG. 4 embodiment. Instead of flexures, however, the body is provided with a pair of spring biased centering pins 68 and 70 which are mounted in threaded inserts 72 and 74. The inserts are hollow and receive springs 76 and 78 which push upwardly on the pins 68 and 70 (which, similar to the protrusion 66, have a rounded profile) FIG. 5 illustrates the clamp element 60 prior to application of a clamping force, whereas FIG. 5(a) shows the clamp element 60 after it has been juxtaposed to the cylindrical member 34. The ends 68 and 70 function the same way as the flexures 46 and 48, in that they deform inwardly after centering the cylindrical member 34 relative to the force vector V, whereas after centering has been achieved, the pin 68 and 70 hold the alignment thereof during application of the clamping force so as to ensure that the contact point centered on the protrusion 66 is in line with the force vector V and the center of the cylindrical member 34.

Numerous modification and adaptations of the present invention will be apparent to those so skilled in the art and thus it is intended by the following claims to cover all such modifications and adaptations which fall within the true spirit of the invention.

I claim:

1. A diametral clamp element for use in a clamping device which measures diametral changes in a substantially cylindrical member having a center, comprising:
   a body having one end connectable to the clamping device;
   a contact point located on an opposite end of the body in line with a clamping force vector of the clamping device; and
   centering means disposed to exert symmetric forces about the contact point, for aligning the center of the substantially cylindrical member with the contact point and thus the clamping force vector, and holding the alignment thereof during application of a clamping force.

2. A diametral clamp element as recited in claim 1, wherein the clamping force deflects the centering means until the contact point meets the cylindrical member.

3. A diametral clamp element as recited in claim 1, wherein the centering means comprises a pair of flexures, each having a flat, angled surface symmetrically disposed about the contact point.

4. A diametral clamp element as recited in claim 3, wherein the two flat angled surfaces are spaced apart by a horizontal flat surface, the center of which provides the contact point.

5. A diametral clamp element as recited in claim 1, wherein the centering means comprises a pair of flexures formed integrally with the body by a pair of radially inwardly extending cuts formed on opposite sides of the body and extending towards each other.

6. A diametral clamp element as recited in claim 1, wherein the centering means comprises a pair of spring loaded pins which protrude outwardly from the body under a spring bias.

7. A diametral clamp element as recited in claim 6, wherein each pin includes a threaded insert for mounting each pin in the body, and a spring mounted within each insert for biasing the pin outwardly.

8. A diametral clamp element as recited in claim 7, wherein each pin has a rounded outer end for providing a centering contact point on each side of the contact point.

9. A diametral clamp element as recited in claim 8, wherein the body is arcuately shaped and has a concave surface which opposes the substantially cylindrical member, the protrusion being formed at the center of the concave surface, in line with the clamping force vector.

* * * * *